UNITED STATES PATENT OFFICE.

DANIEL H. WEEKS, OF VASSALBOROUGH, MAINE.

IMPROVEMENT IN COMPOUNDS FOR USE IN CONSTRUCTING WATER-CISTERNS.

Specification forming part of Letters Patent No. 126,855, dated May 14, 1872.

Specification describing an Improved Compound to be used in the Construction of Water-Cisterns, invented by DANIEL H. WEEKS, of Vassalborough, county of Kennebec, and State of Maine.

The nature of my invention consists in mixing hydraulic cement with fossil-coal, broken brick, or coal-ashes, mixed with pure water, sand, or gravel.

To prepare my compound I take one bushel of the best quality of hydraulic cement and mix it with two bushels of pounded brick, fossil-coal, or coal-ashes, and then add one bushel of sand or fine gravel, and mix the whole mass thoroughly together with water, forming a mortar of suitable consistency, and then apply in the usual manner.

I am aware that a mixture of cement, sand, and gravel has before been used for the construction of water-cisterns; but in many sections of the country gravel is not easily obtained, and this, in part, is the object of my invention. I have also proved, by an experience of thirty-five years in constructing water-cisterns, that the addition of pounded brick, fossil-coal, and coal-ashes to the ordinary mixture of cement, sand and gravel, is a great improvement, forming a substance perfectly impervious to water; that it hardens quicker in wet places, making a compound superior to anything heretofore in use for the above purpose. I have also proved that the above-named article of brick, fossil-coal, and coal-ashes is a perfect substitute for sand and gravel in the construction of water-cisterns, and do not therefore confine myself to the use of sand and gravel with the above mixture.

I claim as my invention—

A compound composed of hydraulic cement, pounded brick, fossil-coal or coal-ashes, either with or without the ordinary mixture of sand and gravel, mixed in or about the proportions described, and for the purposes set forth.

DANIEL H. WEEKS.

Witnesses:
ORRIN P. HOWE,
WILLIAM J. BERRY.